United States Patent [19]
Green

[11] Patent Number: 5,554,072
[45] Date of Patent: Sep. 10, 1996

[54] COAXIAL CONNECTOR FOR CONCENTRIC CYLINDRICAL TUBES

[75] Inventor: Eric T. Green, Harrisburg, Pa.

[73] Assignee: The Whitaker Corporation, Wilmington, Del.

[21] Appl. No.: 410,160

[22] Filed: Mar. 24, 1995

[51] Int. Cl.$^6$ ..................................... H01R 9/07
[52] U.S. Cl. .................. 439/582; 439/100; 439/101
[58] Field of Search ................... 439/578–585, 439/675, 92, 95, 96, 99, 101, 108, 100

[56] References Cited

U.S. PATENT DOCUMENTS

| | | | |
|---|---|---|---|
| 2,694,183 | 11/1954 | Edlen et al. | 439/394 |
| 4,066,324 | 1/1978 | Stephens | 439/582 |
| 4,312,551 | 1/1982 | Mascolo et al. | 439/100 |
| 4,691,976 | 9/1987 | Cowen | 439/582 |
| 5,129,844 | 7/1992 | Goto et al. | 439/778 |
| 5,236,377 | 8/1993 | Goto | 439/779 |
| 5,433,627 | 7/1995 | Guerra et al. | 439/394 |

Primary Examiner—David L. Pirlot
Attorney, Agent, or Firm—Anton P. Ness

[57] ABSTRACT

A connector (10) to connect electrical leads to an inner tube (12) and a spaced apart outer tube (14). A body (16) having a center bore (20) is disposed in an opening (26) in the outer tube (14) and is secured to the outer tube (14) with the body (16) extending outwardly. An adapter (48) is disposed in the bore (20) in the body (16). A coaxially mounted conductor (52) is retractably disposed in the adapter (48). The conductor (52) is electrically insulated from the adapter (48). The conductor (52) has an end (54) which makes electrical contact with the inner tube (12). Electrical leads are attached to the body (16) and to the conductor (52).

15 Claims, 4 Drawing Sheets

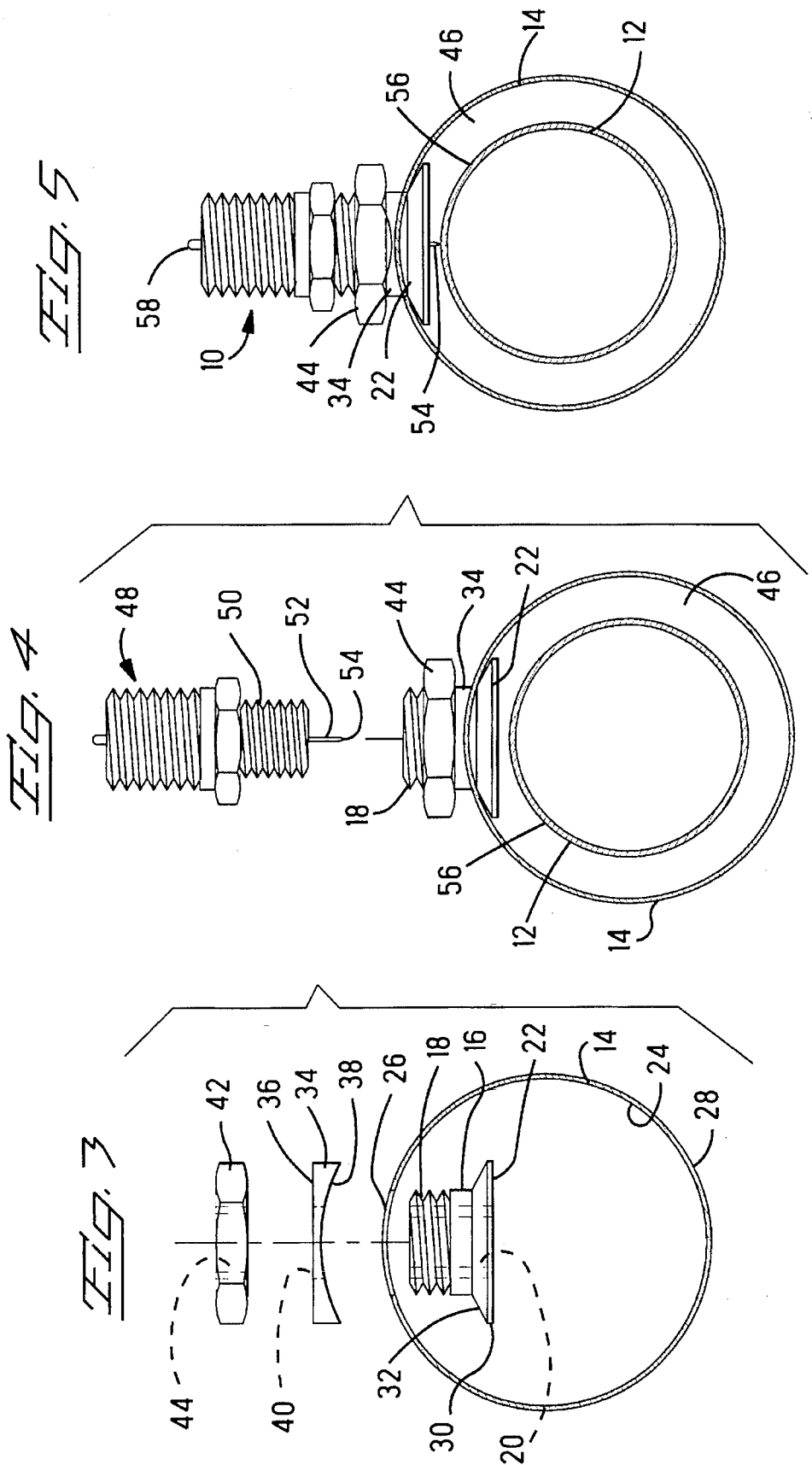

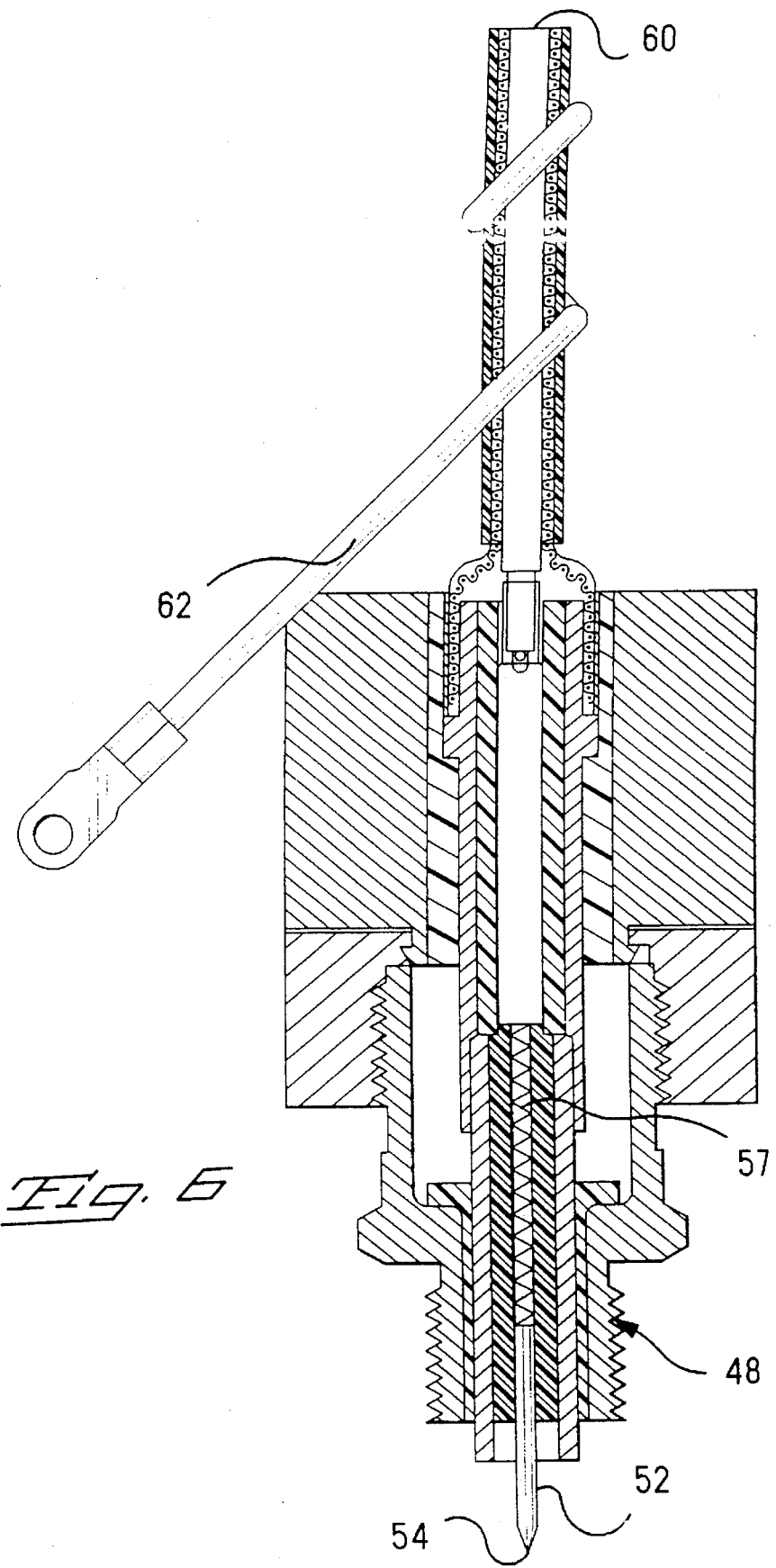

COAXIAL CONNECTOR FOR CONCENTRIC CYLINDRICAL TUBES

FIELD OF THE INVENTION

The present invention relates to a connector for electrical leads for inner and outer cylindrical tubes, and more particularly for a coaxial connector having an inner conductor connected to the inner tube and the body of the connector connected to the outer tube.

BACKGROUND ART

In certain applications there is a need to transmit electrical signals from two concentric tubes to a measuring device. One particular application is in an aircraft where the amount of fuel in a cell is determined by measuring the capacitance between two concentric tubes which extend into the fuel cell. There are a plurality of cells on any single aircraft. Depending upon the type of aircraft and the nature and size of the cells containing fuel, the concentric tubes may be of varying diameters and the spacing between the tubes may vary. Also, any set of concentric tubes may be bent and may have varied spacing. Connectors are known that have a frame mounted on the outer tube with an arcuate shield member between the frame and the arcuate outer surface of the outer tube and spaced therefrom. The arcuate shield member reduces stray capacitance between connector wires and is complementary to the outer tube having a limited range of curvature resulting in the need to have a series of connectors depending upon the degree of curvature of the outer cylinder. The inner tube is also electrically connected through an opening in the outer tube. The electrical leads from the set of inner and outer tubes are brought to terminals on the frame for subsequent connection to the fuel gauge having a sensor to measure the capacitance. The frame and connectors are also bulky requiring space for mounting and access. This contributes to additional weight in an environment where weight is a major design consideration.

Thus, there is a need for a simple electrical connector which is lightweight, compact, easy to install, and adaptable to tubes of varying sizes and curvature with varying spacing between the set of inner and outer tubes.

SUMMARY OF THE INVENTION

The present invention provides a small and lightweight electrical connector to connect to an inner and an outer tube and which can be used with tubes of varying sizes and diameters. A method for assembling the connector is provided.

In accordance with the teachings of the present invention, there is disclosed a connector to connect electrical leads to an inner cylindrical tube and a spaced apart outer cylindrical tube approximately concentric with the inner tube. The outer tube has an opening in a wall thereof. The connector includes a bolt having a head and a body. The body has an axial bore therein. The body of the bolt is disposed in the opening in the outer tube with the head of the bolt between the inner tube and the outer tube. The body of the bolt extends outwardly from the outer tube and has threads formed thereon. A spacer has a first surface and an opposite second surface, the second surface being arcuate and conforming to the curvature of the outer cylindrical tube. The spacer has an axial opening therethrough wherein the body of the bolt is received in the axial opening in the spacer. A nut has a threaded opening therein, the threads complementing the threads on the body of the bolt. In this manner, rotation of the nut secures the bolt to the outer cylindrical tube with the spacer therebetween. An adapter has a coaxially mounted conductor disposed in the axial center thereof, the conductor being electrically insulated from the adapter. The adapter is received in the axial bore on the body of the bolt wherein the conductor has a first end extending between the outer cylindrical tube and the inner cylindrical tube. The first end of the conductor has at least one sharpened point thereon. Said point assures electrical contact with the inner cylindrical tube. The conductor is spring loaded in the adapter wherein force is applied to the conductor against the inner cylindrical tube. The conductor has a second end connected to one electrical lead, the adapter being connected to another electrical lead.

These and other objects of the present invention will become apparent from a reading of the following specification, taken in conjunction with the enclosed drawings.

BRIEF DESCRIPTION OF THE DRAWINGS

FIG. 3 is an end view showing the outer tubes with the body of the connector inside the tube and the spacer and nut outside the tube;

FIG. 4 is an end view showing the body of the connector, the spacer and the nut secured to the outer tube, the adapter outside of the outer tube and the inner tube disposed inside the outer tube;

FIG. 5 is an end view showing the connector attached to the outer tube and electrically contacting the inner tube;

FIG. 6 is a partial cutaway view of the adapter with electrical leads; and

DESCRIPTION OF THE PREFERRED EMBODIMENTS

Figure 1:
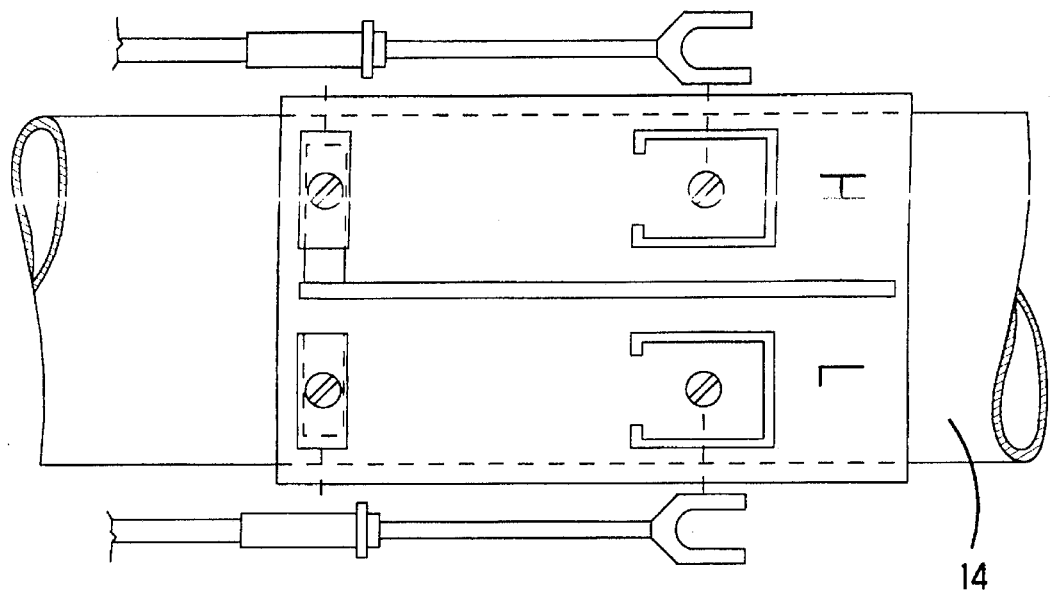
FIG. 1 is a side elevation view showing the prior art arrangement having a frame to mount a terminal board and a shield member to the outer tube.
Figure 2:
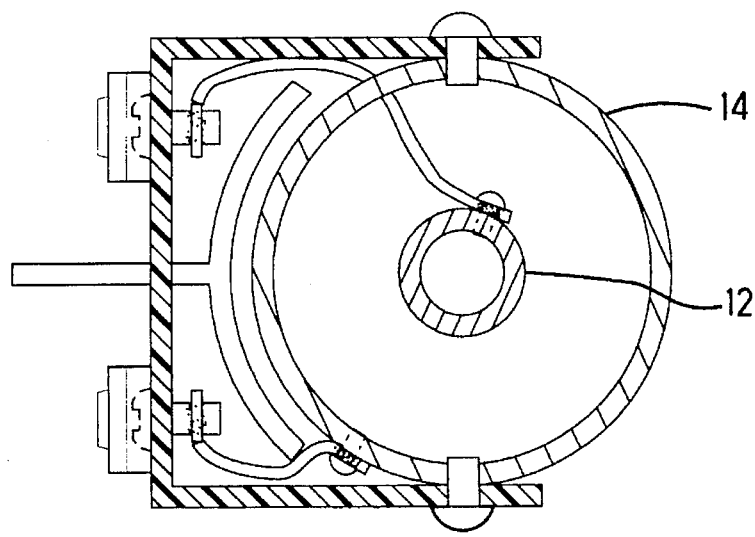
FIG. 2 is an end view of the prior art arrangement of FIG. 1 showing a lead to the inner tube and the curved shield member mounted adjacent to the outer tube and held in place by the frame.

The present invention finds particular application aboard an aircraft in which the fuel is stored in cells which may exceed thirty in number and it is necessary for the pilot to know the amount of fuel remaining. Referring first to the prior art arrangement of FIGS. 1 and 2, a pair of concentric tubes are disposed in each fuel cell and the volume of fuel in the respective cell affects the capacitance between the inner tube 12 and the outer tube 14. The capacitance is measured on a sensor (not shown) which is electrically connected to each pair of tubes. A telescoping tubular subassembly (also not shown) is affixed to the end of the shorter outer tube of each tube pair to be adjusted to increase or decrease the effective length of the outer tube with respect to the longer inner tube extending therebeyond to tune the circuit of the particular tube pair. In the prior art (FIGS. 1–2) a frame of dielectric material is secured to each outer tube and electrical leads are connected to outer tube 14 and to the inner tube 12 from screws secured to the frame. An inner conductor of a coaxial lead has a space terminal terminated thereto and is connected to the electrical lead for the inner tube 12 at a connecting screw, while a single-conductor lead is connected in similar fashion to the electrical lead for the outer tube 14, and both the coaxial and single-conductor leads are clamped to the frame spaced from the connections with the electrical leads. Rearwardly of the clamps, the coaxial and single-conductor leads may be grouped together for handling and routing, preferably within an outer jacket such as heat-recoverable tubing.

An arcuate conductive shield member is disposed adjacent to the outer tube 14 and spaced therefrom a limited distance, such as one-quarter inch; a securing bar extends from a vertical rib of the shield member to the outer conductor of the coaxial cable at its clamp. The curvature (or outer diameter) of the outer tube must be complementary to the curvature (or inner diameter) of the arcuate section of the shield member spaced slightly therefrom, and the frames and outer tubes of each of the tube pairs must have corresponding sizes in order to attach the frame and have a satisfactory electrical contact. Thus, a wide variety of frames and arcuate members must be available. The frame occupies space externally of the outer tube such that space must be provided in an environment in which space is in short supply. Also, the frame, although made of lightweight plastic or aluminum, contributes additional weight to the aircraft, especially considering the number of connectors which are required.

The present invention as shown in FIGS. 3–6, has a body member 16 which is threaded 18 and has a center bore 20. In a preferred embodiment, a head 22 is formed on one end of the body member 16. The head 22 is disposed inside the outer tube 14 adjacent to the inner wall 24 of the outer tube 12. The body member 16 extends through an opening 26 in the outer tube 14 such that the body extends approximately perpendicularly outwardly from the outer wall 28 of the outer tube 14. It is preferred that the head 22 be tapered from the outer peripheral surface 30 of the head 22 toward the body member 16 such that the tapered portion 32 cooperates with the curved inner wall 24 of the outer tube 14.

A spacer 34 has a first surface 36 and an opposite second surface 38. The second surface is arcuate and conforms to the curvature of the outer tube 14. The spacer 34 has an axial opening 40 formed therethrough and receiving therein the body member 16. A nut 42, having a threaded opening 44 therein, is disposed on the body member 16. The threads cooperate and the nut 42 is tightened to secure the body member 16 to the outer tube 14 such that the head 22 is flush with the inner wall 24 of the outer tube 14, and the spacer 34 is between the nut 42 and the outer tube 14, abutting the outer wall 28 of the outer tube 14.

The inner tube 12 is disposed inside the outer tube 14 separated from the outer tube 14 by a space 46. The size of the space 46 is a function of the relative diameter of the inner tube 12 as compared to the diameter of the outer tube 14. This varies from fuel tank to fuel tank and even within any one fuel tank. However, there is a maximum space which is provided with the greatest diameter of the outer tube 14 and the least diameter of the inner tube 12.

An adapter 48 is removably disposed in the center bore 20 in the body member 16. Preferably, the center bore 20 in the body member 16 has threads formed therein. The first end 50 of the adapter is threaded to cooperate with the threads in the center bore 20 in the body member 16. A coaxially mounted conductor 52 is disposed along the vertical axis of the adapter 48 and is electrically insulated from the adapter 48. The conductor 52 is retractable. Although the conductor 52 may be manually retracted, it is preferred that the conductor be spring loaded. The conductor has a first end 54 which extends across the space 46 between the inner wall 24 of the outer tube 14 and the outer wall 56 of inner tube 12. The first end 54 of the conductor 52 preferably has at least one sharpened point formed thereon. The sharpened point breaks any oxide coating on the outer wall 56 of the inner tube 12 to assure electrical contact. The spring 57 applies approximately a 120 gram force load on the conductor 52 to break the oxide coating and maintain electrical contact under gravitational loading as may be experienced in an aircraft environment. The second end 58 of the conductor 52 is connected to a first lead 60 which is, in turn, connected to a sensor. A second lead 62 is connected to the adapter 48 and through the adapter 48 to the body member 16 and to the outer tube 14. The other end of the second lead 62 is connected to the sensor to permit measurement of the capacitance between the outer tube 14 and the inner tube 12.

The thickness of the spacer 34, that is the distance between the first surface 36 and the second surface 38, may be selected to accommodate the difference in the diameters of the outer tube 14 and the inner tube 12, i.e., the space 46. When the diameter of the inner tube 12 is slightly smaller than the diameter of the outer tube 14, the space 46 is relatively small. In this situation, the thickness of the spacer 34 is relatively large. In this manner, a larger portion of the adapter 48 is disposed in the spacer 34 and conductor 52 extends beyond the head 22 a comparatively short distance to contact the outer wall 56 of the inner tube 12 with sufficient resiliency. On the other hand, when the diameter of the inner tube 12 is much smaller than the diameter of the outer tube 14, the space 46 is relatively large. Accordingly, the thickness of the spacer 34 is relatively small such that the adapter 48, disposed in the spacer 34, extends into the head 22 and the conductor S2 extends beyond the head 22 a comparatively large distance to contact the outer wall 56 of the inner tube 12. The spacer 34 is selected to accommodate for large variations in tube diameters and the spring loaded contact is used to accommodate small variations in tube diameters, such as may occur in variations in concentricity or bent tubes. The spring 57 must serve as a means to maintain force between the sharpened tip 54 of the conductor 52 and the outer wall 56 of the inner tube 12, under gravitational loading.

The present invention has been described herein for use with concentric cylindrical tubes, but is equally applicable with polygonal tubes in place of cylinders.

Figure 7:
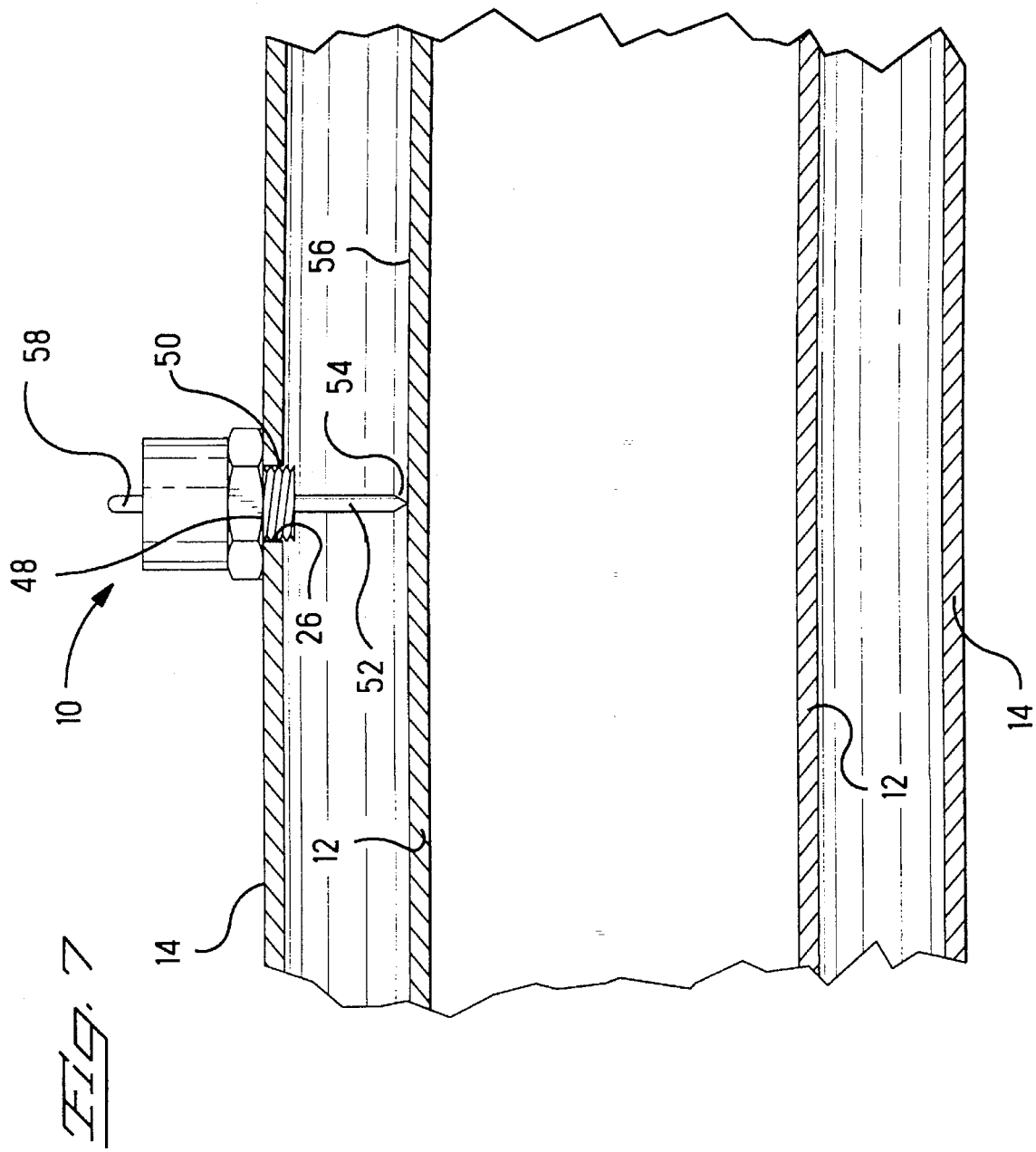
FIG. 7 is a side elevation view of an alternate embodiment of the connector attached to a threaded opening in the outer tube, the tubes being shown in cross section.

In an alternate embodiment of connector 10 (FIG. 7) the opening 26 in the outer tube 14 is threaded and the adapter 46 has cooperating threads formed on the first end 50 thereof. The adapter 46 is threadably connected to the outer tube 14 so that the spring loaded coaxial conductor 52 contacts the outer wall 56 of the inner tube 12. As in the previously described embodiment, the at least one sharpened end 54 of the conductor 52 breaks any oxide coating on the outer wall 56 of the inner tube 12 and electrical contact is maintained. The spring loading also assures that the coaxial conductor 52 extends completely between the adapter 48 and the inner tube 12 irrespective of the spacing between the inner tube 12 and the outer tube 14. That is, the spring 57 urges the coaxial conductor 52 outwardly from the adapter 46 until the conductor 52 contacts the inner tube 12. The alternate embodiment is mounted on the outer tube 14 by simply inserting the adapter 48 into the threaded opening 26 and rotating the adapter 48 until the conductor 52 contacts the inner tube 12. The alternate embodiment may be easily installed on existing cylinders in fuel tanks aboard the aircraft as a retrofit.

Both of the embodiments are lightweight, compact, occupying little space and are easily installed. Each embodiment may be used with the concentric tubes irrespective of the curvature of the tubes or of the spacing between the tubes.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A connector to connect electrical leads to an inner cylindrical tube and a spaced apart outer cylindrical tube, the tubes being approximately concentric with one another, each tube having respectively, an inner wall and an outer wall, the outer cylindrical tube having an opening between the inner wall and the outer wall, the connector comprising:

a body having a center bore therethrough, the body being disposed in the opening in the outer cylindrical tube and extending outwardly from the outer wall of the outer cylindrical tube, the body being secured to the outer cylindrical tube, an adapter disposed in the bore in the body, a coaxially mounted conductor retractably disposed in the adapter and electrically insulated from the adapter, the conductor having a first end and an opposite second end, the first end engaging the outer wall of the inner cylindrical tube and forming an electrical contact therewith, and a first electrical lead connected to the end of the coaxially mounted conductor and a second electrical lead connected to the body of the connector.

2. The connector of claim 1, wherein the opening in the outer cylindrical tube is threaded and the body of the connector has threads formed thereon, the threads on the body of the connector mating with the threads in the opening, thereby securing the body to the outer cylindrical tube.

3. The connector of claim 1, further comprising a head formed on an end of the body of the connector, the head being disposed against the inner wall of the outer cylindrical tube.

4. The connector of claim 3, wherein the head has an outer peripheral surface, the head being tapered from the outer peripheral surface toward the body of the connector.

5. The connector of claim 3, wherein the body of the connector has threads formed thereon, a nut having a threaded opening therein, the threads being complementary to the threads on the body of the connector, the threaded nut being disposed on the body of the connector outside of the outer wall of the outer cylindrical tube to secure the outer cylindrical tube between the head on the body and the nut.

6. The connector of claim 5, further comprising a spacer having a first surface and a second opposite surface, the second surface being arcuate and conforming to the curvature of the outer cylindrical tube, the spacer having an axial opening therethrough wherein the body of the connector is received therein, the spacer being disposed between the outer wall of the outer cylindrical tube and the nut.

7. The method of assembling the connector of claim 6, comprising the steps of inserting the body of the connector into the opening in the outer cylindrical tube such that the head is adjacent to the inner wall of the outer cylindrical tube and the body extends outwardly from the outer wall, placing the spacer on the extending body such that the arcuate surface contacts the outer wall of the outer cylindrical tube, threading the nut onto the body and securing the body of the connector to the outer cylindrical tube with the spacer between the nut and the outer cylindrical tube, disposing the inner cylindrical tube within the outer cylindrical tube, placing the adapter in the bore in the body wherein the first end of the coaxially mounted conductor electrically engages the outer wall of the inner cylindrical tube, securing the adapter to the body, and connecting the first electrical lead to the coaxially mounted conductor and connecting the second electrical lead to the body of the connector.

8. The connector of claim 1, wherein the coaxially mounted conductor is spring loaded such that force is applied to the conductor to engage the outer wall of the inner cylindrical tube.

9. The connector of claim 8, wherein approximately a 120 gram force load is applied to the conductor.

10. The connector of claim 1, wherein the first end of the coaxially mounted conductor has at least one sharpened point formed thereon, the at least one sharpened point assuring electrical contact with the outer wall of the inner cylindrical tube.

11. A connector to connect electrical leads to an inner cylindrical tube and a spaced apart outer cylindrical tube approximately concentric with the inner tube, the outer tube having an opening in a wall thereof, the connector comprising:

a bolt having a head and a body, the body having an axial bore therein, the body of the bolt being disposed in the opening in the outer tube with the head of the bolt between the inner tube and the outer tube, the body of the bolt extending outwardly from the outer tube, and having threads formed thereon, a spacer having a first surface and an opposite second surface, the second surface being arcuate and conforming to the curvature of the outer cylindrical tube, the spacer having an axial opening therethrough wherein the body of the bolt is received in the axial opening in the spacer, a nut having a threaded opening therein, the threads complementing the threads on the body of the bolt, wherein rotation of the nut secures the bolt to the outer cylindrical tube with the spacer therebetween, and an adapter having a coaxially mounted conductor disposed in the axial center thereof, the conductor being electrically insulated from the adapter, the adapter being received in the axial bore in the body of the bolt wherein the conductor has a first end extending between the outer cylindrical tube and the inner cylindrical tube, the first end having at least one sharpened point thereon, said point assuring electrical contact with the inner cylindrical tube, the conductor being spring loaded in the adapter wherein force is applied to the conductor against the inner cylindrical tube, the conductor having a second end connected to one electrical lead, the adapter being connected to another electrical lead.

12. A connector for a fuel gauge in a fuel cell having an inner tube and a spaced-apart concentric outer tube, and a spacing formed between the walls of each tube, comprising:

a housing mountable to the outer tube and at least including a conductive adapter through which a bore extends, said adapter being affixable to the outer tube and extending through an outer tube opening to an inner end concluding inside the outer tube; and an inner contact assembly insulated from conductive sections of said housing and mounted within said adapter bore to extend beyond said housing and through said outer wall opening;

said inner contact assembly including a conductor being coaxially mounted and retractably disposed in said bore of said adapter, said conductor including a first end and a second end, said first end engaging the outer wall of the inner tube and forming an electrical connection therewith, and said second end being exposed outwardly of the outer wall for being electrically connected to the fuel gauge.

13. The connector of claim 12 wherein the coaxially mounted conductor is spring loaded such that force is applied to said conductor for said first end thereof to engage the outer wall of the inner tube.

14. The connector of claim 12 wherein said first end of said coaxially mounted conductor has at least one sharpened point formed thereon, said at least one sharpened point assuring electrical contact with the outer wall of the inner tube.

15. The connector of claim 12 wherein the opening in the outer tube is threaded and said adapter has complementary threads formed on said inner end thereof so that inner end is threadable into the threaded opening, thereby securing said adapter to the outer tube and establishing an electrical connection therewith.

* * * * *